United States Patent
Kosar et al.

(10) Patent No.: US 10,987,639 B2
(45) Date of Patent: Apr. 27, 2021

(54) AMPHIPHILIC DIBLOCK COPOLYMER AND USE OF SAME FOR PRODUCING POLYMERIC FILTER MEMBRANES

(71) Applicants: Arkema France, Colombes (FR); Polymem, Castanet-Tolosan (FR)

(72) Inventors: Walter Phillip Kosar, Pottstown, PA (US); Olivier Lorain, Portet S/Garonne (FR); Sébastien Marcellino, Toulouse (FR); François Beaume, Saint Genis Laval (FR); Pierre Gerard, Denguin (FR)

(73) Assignees: Arkema France, Colombes (FR); Polymem, Castanet-Tolosan (FR)

( * ) Notice: Subject to any disclaimer, the term of this patent is extended or adjusted under 35 U.S.C. 154(b) by 83 days.

(21) Appl. No.: 16/073,855

(22) PCT Filed: Feb. 1, 2017

(86) PCT No.: PCT/EP2017/052089
§ 371 (c)(1),
(2) Date: Jul. 30, 2018

(87) PCT Pub. No.: WO2017/134067
PCT Pub. Date: Aug. 10, 2017

(65) Prior Publication Data
US 2019/0039029 A1    Feb. 7, 2019

(30) Foreign Application Priority Data

Feb. 1, 2016   (FR) .................................... 1650789

(51) Int. Cl.
*B01D 71/80*     (2006.01)
*C08F 293/00*   (2006.01)
(Continued)

(52) U.S. Cl.
CPC ........... *B01D 71/80* (2013.01); *B01D 61/145* (2013.01); *B01D 61/147* (2013.01); *B01D 71/32* (2013.01);
(Continued)

(58) Field of Classification Search
CPC .... B01D 71/80; B01D 61/145; B01D 61/147; B01D 71/32; B01D 71/40; B01D 2323/12;
(Continued)

(56) References Cited

U.S. PATENT DOCUMENTS

| | | | |
|---|---|---|---|
| 9,707,524 B2 | 7/2017 | Kosar et al. | |
| 9,873,095 B2 | 1/2018 | Lorain et al. | |
| 2016/0030896 A1* | 2/2016 | Lorain ................... | B01D 71/34 210/650 |

FOREIGN PATENT DOCUMENTS

| | | | |
|---|---|---|---|
| WO | 2010051150 A1 | 5/2010 | |
| WO | 2014139977 A1 | 9/2014 | |
| WO | WO-2014139977 A1 * | 9/2014 | ................ C02F 1/44 |

OTHER PUBLICATIONS

Arkhangelsky et al., "Impact of Chemical Cleaning on Properties and Functioning of Polyethersulfone Membranes", Journal of Membrane Science, vol. 305 (2007) pp. 176-184.
(Continued)

*Primary Examiner* — James C Goloboy
(74) *Attorney, Agent, or Firm* — RatnerPrestia

(57) ABSTRACT

Provided is a an amphiphilic diblock copolymer including from 40 to 60% by weight, relative to the weight of the copolymer, of a hydrophilic block including a unit derived from an n-butyl acrylate monomer and a derived from a hydroxyethyl methacrylate monomer. The copolymer also includes from 40 to 60% by weight, relative to the weight of the copolymer, of a hydrophobic block including at least one unit derived from a methyl methacrylate monomer. Also
(Continued)

provided is a polymeric membrane that includes the block copolymer and a hydrophobic polymeric matrix. This membrane is useful for treating an effluent, for example, water.

12 Claims, 2 Drawing Sheets

(51) Int. Cl.
  *B01D 71/40* (2006.01)
  *C08L 27/16* (2006.01)
  *B01D 61/14* (2006.01)
  *B01D 71/32* (2006.01)
  *C08F 220/18* (2006.01)
  *C08F 220/28* (2006.01)

(52) U.S. Cl.
  CPC ............ *B01D 71/40* (2013.01); *C08F 220/18* (2013.01); *C08F 220/28* (2013.01); *C08F 293/005* (2013.01); *C08L 27/16* (2013.01); *B01D 2323/12* (2013.01); *B01D 2325/18* (2013.01); *C08F 220/1804* (2020.02); *C08F 2800/20* (2013.01)

(58) Field of Classification Search
  CPC ............... B01D 2325/18; C08F 220/18; C08F 220/1804; C08F 220/28; C08F 293/005; C08F 2800/20; C08L 27/16; C08L 53/00
  See application file for complete search history.

(56) References Cited

OTHER PUBLICATIONS

International Search Report and Written Opinion for International Application No. PCT/EP2017/052089, dated Mar. 27, 2017—7 pages.
Oikonomou et al., "Swelling of Semi-Crystalline PVDF by a PMMA-Based Nanostructured Diblock Copolymer: Morphology and Mechanical Properties", Polymer, vol. 76 (2015) pp. 89-97.
Peng et al., "Evolution of Polymeric Hollow Fibers as Sustainable Technologies: Past, Present, Future", Progress in Polymer Science, vol. 37 (2012) pp. 1401-1424.
Rouaix et al., "Experimental Study of the Effects of Hypochlorite on Polysulfone Membrane Properties", J. Membr. Sci., vol. 277, pp. 137-147.
Wienk et al., "Chemical Treatment of Membranes of a Polymer Blend: Mechanism of the Reaction of Hypochlorite with Poly(Vinyl Pyrrolidone)" Journal of Polymer Science: Part A: Polymer Chemistry, vol. 33, pp. 49-54.
Fontananova, E., "Effect of Additives in the Casting Solution on the Formation of PVDF Membranes," Desalination, vol. 192, (Issues 1-3):190-197 (May 10, 2006).
Hester, J.F., "Preparation of Protein-Resistant Surfaces on Poly(vinylidene fluoride) Membranes Via Surface Segregation," Macromolecules, vol. 32 (No. 5)1643-1650 (1999).
McKelvey, S.A., "A Guide to Establishing Hollow Fiber Macroscopic Properties for Membrane Applications," Journal of Membrane Science, vol. 124 (Issue 2):223-232 (Feb. 19, 1997).
Qin, J.J., "Hypochlorite Treatment of Hydrophilic Hollow Fiber Ultrafiltration Membranes for High Fluxes," Desalination, vol. 146 (Issues 1-3):307-309 (Sep. 10, 2002).

* cited by examiner

AMPHIPHILIC DIBLOCK COPOLYMER AND USE OF SAME FOR PRODUCING POLYMERIC FILTER MEMBRANES

CROSS-REFERENCE TO RELATED APPLICATIONS

This is the national phase of International Application No. PCT/EP2017/052089, filed 1 Feb. 2017, which claims priority to French Application No. 1650789, filed 1 Feb. 2016. The disclosure of each of these applications is incorporated herein by reference in its entirety for all purposes.

FIELD OF THE INVENTION

The present invention relates to the field of polymeric filtration membranes, especially for microfiltration or ultrafiltration, intended for the treatment of effluents.

More specifically, the present invention relates to an amphiphilic diblock copolymer containing two blocks, one hydrophilic block comprising a copolymer of n-butyl acrylate and of hydroxyethyl methacrylate, and one hydrophobic block comprising polymethyl methacrylate.

BACKGROUND OF THE INVENTION

Microfiltration (MF) and ultrafiltration (UF) membranes are frequently used to carry out the purification of effluents, in particular of water for the production of drinking water or the treatment of wastewater before it is discharged to the environment.

The polymeric MF or UF membranes are generally manufactured by a technique referred to as phase inversion, consisting in forming a solution of polymer and additive(s), commonly referred to as collodion, in shaping this solution and finally in causing the coagulation thereof by bringing into contact with a coagulation solution containing a nonsolvent of the polymer. Following exchanges of material which take place between the collodion and the nonsolvent, a liquid/liquid phase separation takes place, resulting in the formation of a first, polymer-rich, phase, which forms the membrane, and a second, polymer-poor, phase, which forms the pores of the membrane. The liquid/liquid phase separation can also be triggered by a change in temperature.

The additives influence the structural properties and performance properties of the membrane. They are especially used as pore-forming agents, hydrophilizing/hydrophobizing agents, electrical conductors, mechanical reinforcements and/or structuring agents. In the case of semicrystalline polymers, such as polyvinylidene fluoride (PVDF), frequently used for the manufacture of filtration membranes, the additives may especially influence the formation of the crystallites which confer properties of mechanical strength and/or chemical resistance on the material constituting the membrane.

The desired performance properties for a filtration membrane are of three types:
  filtration performance, in particular from the perspective of permeability and selectivity;
  structural properties, conferring especially more or less elevated properties of mechanical strength and chemical resistance on the membrane, depending on the surface state of the membrane; and
  resistance in operation, that is to say resistance to aging and durability of filtration performance over time.
  This resistance is defined as the ability of a membrane to keep its filtration, surface and mechanical strength properties in tact during the filtration of effluents to be treated but also on contact with chemical rinsing solutions, such as chlorinated solutions, systematically employed for the cleaning of the membranes between two filtration cycles. The choice of the additives makes it possible to adjust one or more of these types of properties of the membrane.

The prior art has proposed the use, as additives for the manufacture of membranes, of copolymers which make it possible to combine, in themselves alone, the advantages of several additives and more particularly amphiphilic block copolymers, as described, for example, in the patent application WO 2010/051150. Due to their particular structure, amphiphilic block copolymers adopt specific conformations in solution and especially undergo micellization in solution. During the implementation of a phase inversion process for the manufacture of a polymeric membrane, due to the presence of water in the coagulation bath, the hydrophilic chains of these copolymers are attracted towards the surface of the membrane, where they become segregated, then conferring specific anti-blinding surface properties on the membranes.

Increasing the lifetime of polymeric filtration membranes also constitutes a major challenge. Membranes are marketed with recommendations relating to their use, especially regarding the maximum momentary concentration of free sodium hypochlorite (NaOCl), and regarding the pH regions in filtration and in washing, recommended so as to increase their lifetime. These limits on the use of membranes are due not only to the resistance of their base material but also to that of the additives used.

Thus, it is for example known that polyvinylpyrrolidone (PVP) is an additive widely used for the manufacture of polymeric filtration membranes, especially for providing them with surface hydrophilicity, as indicated by Fontananova et al., 2006, *Desalination* 192: 190-197, unfortunately only temporarily. This is because, after several months of operation, the hydrophilic additive is rejected. Hydrophilization is therefore not durable.

It is also known that PVP is degraded by chlorinated solutions widely used for the washing of membranes, as described by Wienk et al., 1995, *J. Polym. Sci. A. Polym. Chem.* 33: 49, or Qin et al., 2002, *Desalination* 146: 307-309, or else Rouaix et al., 2006, *J. Membr. Sci.* 277: 137-147.

Membranes comprising PVP then lose their surface properties over time due to the degradation of the PVP, and their lifetime is limited thereby. More particularly, contact of the membranes comprising PVP with an NaOCl solution brings about an increase in their permeability and a decrease in their selectivity. These observations result from an increase in the size of the pores, and also a decrease in their mechanical strength, as explained by Arkhangelsky et al., 2007, *J. Membr. Sci.* 305: 176-184.

It has also been shown that additives of copolymer type could be destroyed by acidic chemical solutions, as specified by Hester et al., 1999, *Macromolecules* 32: 1643-1650. The surface state of the membranes may be regenerated by carrying out an annealing operation on the membrane at 90° C. for 12 hours. Such an annealing operation is not, however, compatible with industrial use of the membranes, since it can be expensive and in addition it is not completely effective. Indeed, it has especially been observed that the resistance to the absorption of proteins (bovine serum albumin (BSA)) of membranes after a single acid treatment of 30 minutes is very markedly lower than that of new membranes. The surface regeneration by annealing of the membrane only makes it possible to recover just some of the protective effect of the copolymer with regard to BSA absorption.

Moreover, patent application WO 2014/139977 describes amphiphilic block copolymers with a particular composition, used as additives for the manufacture of polymeric filtration membranes, which make it possible to manufacture membranes having improved surface properties, especially in terms of hydrophilicity or roughness. In addition, the overall chemical resistance of these membranes is superior to that observed in the context of using convention additives such as PVP, and the durability of the surface modifications brought about by the additive is increased.

However, these membranes do not exhibit entirely satisfactory behavior regarding permeability properties. Indeed, the permeability losses during filtration tests on river water are relatively large.

It would therefore be advantageous to provide an additive for manufacturing polymeric filtration membranes such that said membranes have improved permeability properties.

SUMMARY OF THE INVENTION

Therefore, a subject of the present invention is an amphiphilic diblock copolymer consisting of:
  from 40 to 60% by weight, relative to the weight of the copolymer, of a hydrophilic block comprising at least one unit derived from an n-butyl acrylate monomer and at least one unit derived from a hydroxyethyl methacrylate monomer, and
  from 40 to 60% by weight, relative to the weight of the copolymer, of a hydrophobic block comprising at least one unit derived from a methyl methacrylate monomer.

Another subject of the present invention is the use of the copolymer according to the invention as additive for the manufacture of a polymeric filtration membrane.

Another subject of the present invention is a polymeric membrane comprising at least one hydrophobic polymeric matrix and at least one copolymer according to the invention.

Finally, a subject of the invention is the use of said polymeric membrane comprising at least one copolymer according to the invention for the treatment of effluents such as water.

BRIEF DESCRIPTION OF THE FIGURES

Other advantages and characteristics of the invention will become more clearly apparent on examining the detailed description and the appended drawings, in which.

DETAILED DESCRIPTION OF THE INVENTION

Figure 1A:
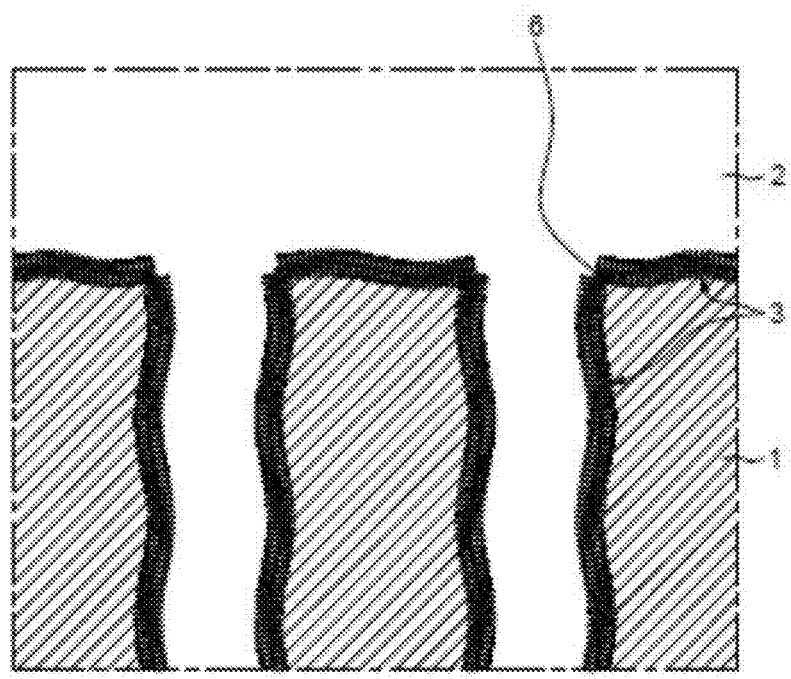
FIG. 1A is a schematic representation of a filtration membrane comprising several copolymers according to the invention.

Furthermore, it is specified that the expression "from . . . to . . ." used in the present description should be understood as including each of the limits mentioned.

The invention relates to an amphiphilic copolymer consisting of two blocks; one hydrophilic block and one hydrophobic block.

"Hydrophilic block" is intended to mean, according to the present invention, a block that is water-soluble, water-dispersible or generally which has the ability to absorb and/or release water.

The hydrophilic block of the copolymer according to the invention may be selected from:
  a statistical, alternating or random copolymer, comprising at least said unit derived from a hydrophilic n-butyl acrylate monomer, and at least said unit derived from a hydroxyethyl methacrylate monomer, and optionally one or more units derived from hydrophilic monomers other than the abovementioned monomers, selected from 2-acrylamido-2-methylpropane sulfonate, methacrylic acid, acrylic acid, dimethylacrylamide, methoxyethyl acrylate, styrenesulfonic acid, polyethylene glycol acrylate, polyethylene glycol methyl ether methacrylate, polyethylene glycol methacrylate and vinylpyrrolidone, and
  a statistical, alternating or random copolymer, comprising at least said unit derived from a hydrophilic n-butyl acrylate monomer and at least said unit derived from a hydroxyethyl methacrylate monomer, and optionally one or more units derived from hydrophobic monomers, and
  one or more other units derived from hydrophilic monomers other than the abovementioned monomers, selected from 2-acrylamido-2-methylpropane sulfonate, methacrylic acid, acrylic acid, dimethylacrylamide, methoxyethyl acrylate, styrenesulfonic acid, polyethylene glycol acrylate, polyethylene glycol methyl ether methacrylate, polyethylene glycol methacrylate and vinylpyrrolidone.

Advantageously, said hydrophilic block of the copolymer according to the invention consists only of statistical, random or alternating copolymer, containing at least one unit derived from an n-butyl acrylate monomer and at least one unit derived from a hydroxyethyl methacrylate monomer.

Particularly advantageously, said hydrophilic block is composed of a statistical copolymer containing at least one unit derived from an n-butyl acrylate monomer and at least one unit derived from a hydroxyethyl methacrylate monomer.

Preferably, the content of said hydrophilic block of said copolymer is from 45 to 55% by weight, relative to the weight of the copolymer, preferably 50% by weight.

Preferably, said hydrophilic block comprises from 50 to 99% by weight, preferentially from 70 to 95% by weight, of units derived from an n-butyl acrylate monomer, relative to the weight of said hydrophilic block, and from 1 to 50% by weight, preferentially from 5 to 30% by weight, of units derived from a hydroxyethyl methacrylate monomer, relative to the weight of said hydrophilic block.

The hydrophilic block preferably has a number-average molecular weight ranging from 5 to 200 kg/mol, and a weight-average molecular weight ranging from 10 to 400 kg/mol. Its polydispersity index preferentially ranges from 1.5 to 5.

"Hydrophobic block" according to the present invention is a block which is not soluble or dispersible in water.

The hydrophobic block of the copolymer according to the invention may be selected from:
  a statistical, random or alternating copolymer, comprising at least said unit derived from a methyl methacrylate monomer and at least one unit derived from one or more other hydrophobic monomers other than methyl methacrylate,
a statistical, random or alternating copolymer, comprising at least said unit derived from a methyl methacrylate monomer, and optionally:
one or more other units derived from hydrophobic monomers, other than the methyl methacrylate, and
one or more units derived from hydrophilic monomers, preferably such as those mentioned above, and polymethyl methacrylate.

Preferably, the content of said hydrophobic block of said copolymer is from 45 to 55% by weight, relative to the weight of the copolymer, preferably 50% by weight.

Preferentially, said hydrophobic block of the copolymer according to the invention comprises at least 50% by weight of polymethyl methacrylate, more preferentially at least 70% by weight, even more preferentially at least 90% by weight, relative to the weight of said hydrophobic block.

Particularly preferably, said hydrophobic block consists of polymethyl methacrylate (PMMA).

In the particular field of application of the amphiphilic block copolymer according to the invention for the manufacture of polymeric membranes, the hydrophobic block is advantageously selected to be compatible with the polymer(s) forming the filtration membrane. The methyl methacrylate homopolymer is especially compatible with the PVDF involved in the composition of numerous membranes.

Preferentially, the amphiphilic diblock copolymer consists of:
from 45 to 55% by weight, relative to the weight of the copolymer, of a hydrophilic block comprising at least one unit derived from an n-butyl acrylate monomer and at least one unit derived from a hydroxyethyl methacrylate monomer, and
from 45 to 55% by weight, relative to the weight of the copolymer, of a hydrophobic block comprising at least one unit derived from a methyl methacrylate monomer.

Particularly preferably, the amphiphilic diblock copolymer consists of:
50% by weight, relative to the weight of the copolymer, of a hydrophilic block comprising at least one unit derived from an n-butyl acrylate monomer and at least one unit derived from a hydroxyethyl methacrylate monomer, and
50% by weight, relative to the weight of the copolymer, of a hydrophobic block comprising at least one unit derived from a methyl methacrylate monomer.

Advantageously, said copolymer is a (poly-n-butyl acrylate-co-polyhydroxyethyl methacrylate-b-hydrophobic block) copolymer, the hydrophobic block comprising at least 50% by weight of polymethyl methacrylate, preferentially at least 70% by weight, even more preferentially at least 90% by weight, relative to the weight of the copolymer, and a mixture of units derived from methacrylate or acrylate monomers, preferably units derived from an n-butyl acrylate monomer and units derived from a hydroxyethyl methacrylate monomer.

According to a particular embodiment, the copolymer according to the invention is a (poly-n-butyl acrylate-co-polyhydroxyethyl methacrylate-b-polymethyl methacrylate) copolymer, said copolymer consisting of 50% by weight of hydrophilic blocks and 50% by weight of hydrophobic blocks.

The copolymer according to the invention may contain neutralizable monomers and in some cases these monomers may be pre-neutralized.

"Neutralized" means that the hydrophilic block of the copolymer according to the invention is completely or partially in salt form. The neutralization may occur at any time in the polymerization, or during a post-polymerization process, such as one comprising steps of formulation, mixing, or manufacturing of films, parts, articles or membranes.

Advantageously, the weight-average molecular weight of said copolymer ranges from 10 to 400 kg/mol, preferentially from 15 to 100 kg/mol, and the number-average molecular weight ranges from 7 to 50 kg/mol. Its polydispersity index preferably ranges from 1.5 to 5.

The present invention also relates to a process for obtaining the hydrophilic block, hydrophobic block, and the copolymer according to the invention.

According to one particular embodiment of the invention, said hydrophilic block, said hydrophobic block, preferably both blocks, are obtainable by a controlled radical polymerization (CRP) process, preferably by stable free radical polymerization in the presence of at least one alkoxyamine, preferably a monoalkoxyamine of the following formula (I):

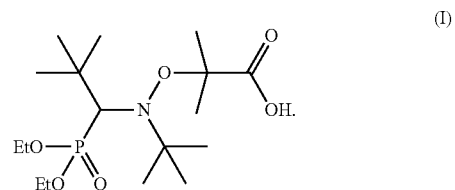 [SMILES: CCOP(=O)(OCC)C(N(OC(C)(C)C(=O)O)C(C)(C)C)C(C)(C)C]

Generally, the blocks of the copolymers according to the invention may be synthesized by any type of controlled radical polymerization, at a temperature suitable for the type of CRP chosen (depending on whether it is SFRP, ATRP or RAFT) and for the chosen monomers of the copolymer.

Several types of controlled radical polymerization exist, depending on the nature of the control agent used:
the type using nitroxides as control agent and, for example as initiator of the alkoxyamines, known under the abbreviation SFRP (Stable Free Radical Polymerization);
the type using metal complexes as control agent and, for example as initiator of the halogenated compounds, known under the abbreviation ATRP (Atom Transfer Radical Polymerization);
the type using sulfur-containing compounds such as dithioesters, trithiocarbamates, xanthates, dithiocarbamates, known under the abbreviation RAFT (Reversible Addition Fragmentation Transfer).

Advantageously, the radical polymerization technique used is SFRP polymerization, preferably carried out in the presence of at least one alkoxyamine, this type of compound performing both the role of initiator and control agent.

Alkoxyamines used advantageously for the preparation of the copolymer according to the invention may be chosen from the monoalkoxyamines of the following formula (II):

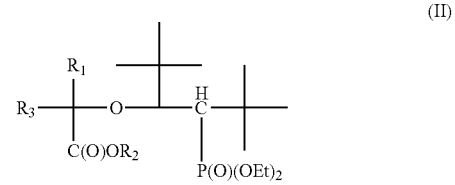

in which:
R₁ and R₃, which are identical or different, independently of one another represent a linear or branched, saturated or unsaturated $C_1$-$C_3$ alkyl group;
R₂ is chosen from a hydrogen atom, an alkali metal such as Li, Na or K, an ammonium ion such as $NH_4^+$, $NBu_4^+$, $NHBu_3^+$, a linear or branched, saturated or unsaturated $C_1$-$C_8$ alkyl group and a phenyl group.

A particular example of monoalkoxyamine particularly preferred within the context of the invention is that corresponding to the above formula (I). It is sold by Arkema under the trade name BlocBuilder®MA.

Other alkoxyamines that may be used for preparing the copolymer according to the invention are polyalkoxyamines resulting from a process consisting in reacting one or more alkoxyamines of the above formula (II) with at least one polyunsaturated compound of the following formula (III):

(III)

in which Z represents an aryl group or a group of formula $Z_1$—[X—C(O)]$_n$—, in which:
Z₁ represents a polyfunctional structure originating for example from a compound of polyol type;
X is chosen from an oxygen atom, a nitrogen atom bearing a carbon-based group or an oxygen atom, and a sulfur atom; and
n is an integer greater than or equal to 2,
in the presence or absence of solvent(s) preferably chosen from alcohols such as ethanol, aromatic solvents, chlorinated solvents, ethers and polar aprotic solvents, at a temperature generally ranging from 0 to 90° C., preferably from 25 to 80° C., the molar ratio of monoalkoxyamine(s) of formula (II) to polyunsaturated compound(s) of formula (III) ranging from 1.5 to 1.5*n, preferably from n to 1.25*n, this step optionally being followed by a step of evaporation of the optional solvent(s).

The polyunsaturated compound of formula (III) may be chosen from polyfunctional vinylbenzenes (Z then being an aryl group) or from polyfunctional acrylic derivatives (Z then being a group of formula $Z_1$—[X—C(O)]$_n$—).

Preferably, the polyunsaturated compound is chosen from divinylbenzene, trivinylbenzene, ethylene glycol diacrylate, 1,3-butanediol diacrylate, 1,4-butanediol diacrylate, 1,6-hexanediol diacrylate, neopentyl glycol diacrylate, cyclohexanedimethanol diacrylate, diethylene glycol diacrylate, triethylene glycol diacrylate, tetraethylene glycol diacrylate, dipropylene glycol diacrylate, tripropylene glycol diacrylate, polyethylene glycol diacrylates (sold by Sartomer under the names SR259, SR344 and SR610), hexanediol alkoxylate diacrylates (sold by Sartomer under the names CD561, CD565 and CD560), bisphenol A diacrylate, bisphenol A ethoxylate diacrylates (sold by Sartomer under the names SR349, SR601, SR602 and CD9038), trimethylolpropane triacrylate, pentaerythritol triacrylate, tris(2-hydroxyethyl)isocyanurate ethoxylate triacrylates (sold by Sartomer under the names SR454, SR499, SR502, SR9035 and SR415), glyceryl propoxylate triacrylates (sold by Sartomer under the name SR9020), trimethylolpropane propoxylate triacrylate (sold by Sartomer under the names SR492 and CD501), pentaerythritol tetraacrylate, ditrimethylolpropane tetraacrylate, pentaerythritol ethoxylate tetraacrylate (sold by Sartomer under the name SR494), dipentaerythritol pentaacrylate, caprolactones-modified dipentaerythritol hexaacrylates (sold by Sartomer under the names Kayarad DCPA20 and DCPA60) or dipentaerythritol polyacrylate (sold by UCB Chemicals under the name DPHPA).

The polyoxyamines produced in this way preferentially correspond to the following formula (IV):

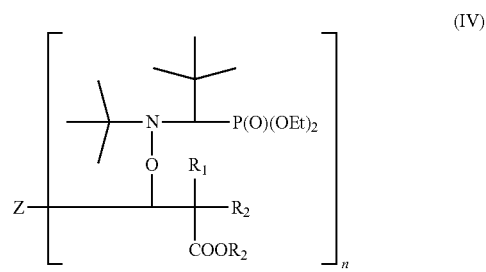
(IV)

in which n, R₁, R₂ and R₃, and Z have the same meanings as those given above.

A particular example of polyalkoxyamine in accordance with the general definition given above is the polyoxyamine of the following formula (V):

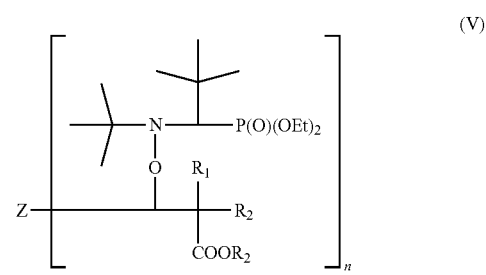
(V)

The alkoxyamine or polyalkoxyamine may be introduced into the polymerization medium at an amount of 0.01 to 10%, preferably 0.1 to 5% by weight, relative to the weight of monomer(s) involved in the composition of the copolymer according to the invention.

The step of polymerization in order to produce the blocks is carried out at a temperature suitable for the type of monomers involved in the composition of the block. The polymerization temperatures depend on the monomers forming the block. Thus, in order to initiate the polymerization of acrylate monomers and methacrylate monomers from alkoxyamines as defined above, a temperature of greater than 50° C., preferably less than 130° C., preferably ranging from 90° C. to 125° C., will be chosen.

The degree of conversion of the constituent monomers or mixture of constituent monomers of the blocks generally depends on the manufacturing time devoted to the block and is generally set so as to obtain a block having a predetermined number-average molar mass.

Between two steps of preparation of two adjacent blocks and after the step of preparation of the final block (that is to say, the end block), there may especially be provided a step of polymerization of the residual constituent monomer(s) of the block which has just been synthesized.

This polymerization is generally carried out by conventional radical polymerization, by addition, to the medium in which the block has just been produced, of a conventional radical polymerization initiator generally chosen from peroxide compounds (such as a peroxide compound of the Luperox® range), persulfate compounds (such as sodium persulfate, potassium persulfate or ammonium persulfate), azo compounds (such as azobisisobutyronitrile, called AiBN, 2,2'-azobis(2-amidinopropane) dihydrochloride and the metal and ammonium salts of 4,4'-azobis(4-cyanopentanoic acid)) or redox compounds (such as the persulfate (sodium, potassium or ammonium)/vitamin C pair, the sodium or potassium persulfate/metabisulfite pair, the aqueous hydrogen oxide solution/salts of the ferrous ion pair, the tert-butyl hydroperoxide/sodium sulfoxylate pair and any other possible oxidizing agent(s)/reducing agent(s) combination).

The polymerization temperature of this step is preferably chosen so as to be lower by at least 20° C. than the polymerization temperature of the block which has just been polymerized. The act of reducing the temperature makes it possible to retain the block previously synthesized in the living polymer form, without, however, continuing the polymerization thereof.

The copolymer according to the invention has applications in numerous fields.

In particular, the present invention relates to the use of said copolymer as additive for the manufacture of a polymeric filtration membrane, such as for microfiltration or ultrafiltration.

Figure 1B:
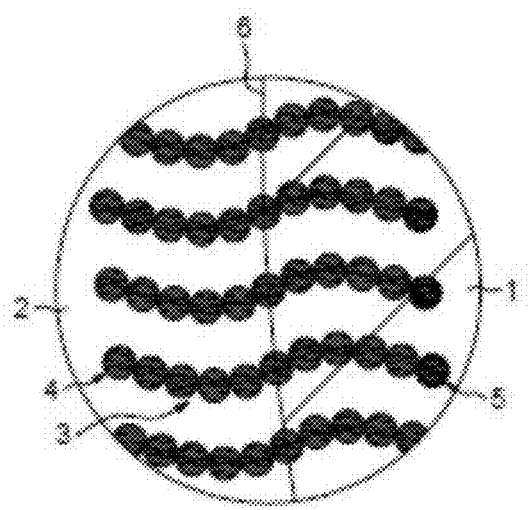
FIG. 1B is a close-up of FIG. 1A representing copolymers according to the invention, consisting of a hydrophilic block and a hydrophobic block anchored in the filtration membrane.

By virtue of the hydrophobic block, the copolymer according to the invention enables durable anchoring in a hydrophobic polymeric matrix as shown in FIGS. 1A and 1B.

FIG. 1A represents a diagram of a hydrophobic filtration membrane 1 filtering water 2. According to FIG. 1B, which represents a close-up of FIG. 1A, said membrane 1 comprises a copolymer 3 according to the invention comprising a hydrophilic block 4 and a hydrophobic block 5. Said hydrophilic block 4 is pushed away from the membrane, by virtue of the covalent bond between the two hydrophilic 4 and hydrophobic 5 blocks, it remains at the interface 6 of the filtration membrane 1, providing it with a durable hydrophilic nature. Unlike the conventional additives which disappear gradually, the copolymer according to the invention is well retained by virtue of its hydrophobic anchoring in the hydrophobic membrane.

Thus, the hydrophilic block 4 is spread over the porosity of the filtration membrane 1, thereby enabling it to confer particularly advantageous permeability properties. Indeed, the particular composition of the copolymer 3 according to the invention makes it possible to obtain a stable structure of said membrane and effective use of the hydrophilic block 4. Consequently, an internal surface of the hydrophilic pores is generated, making it possible to increase the flow rate of water to be filtered and therefore the permeability of the membrane.

The present invention also relates to a polymeric membrane, especially for microfiltration or ultrafiltration, which comprises at least one hydrophobic polymeric matrix and at least one copolymer according to the invention.

Advantageously, the hydrophobic polymeric matrix is a fluoropolymer, preferably a polyvinylidene fluoride (PVDF) homopolymer. This fluorinated homopolymer preferably has a melt viscosity ranging from $10^2$ to $10^4$ Pa·s at 230° C. and 100 $s^{-1}$ according to standard ASTM D3835, published in 2008.

According to another embodiment, the PVDF is a copolymer of vinylidene fluoride (VDF) with at least one other comonomer chosen from chlorotrifluoroethylene (CTFE), hexafluoropropylene (HFP), trifluoroethylene ($VF_3$), tetrafluoroethylene (TFE) and ethylene.

Advantageously, said copolymer contains at least 75% by weight of VDF, preferably at least 85% by weight of VDF, which gives it a thermoplastic character. These polymers may be obtained by known polymerization methods, such as solution, emulsion or suspension polymerization. According to one embodiment, the PVDF is prepared by an emulsion process in the absence of a fluorinated surfactant.

In a particular embodiment of the invention, the membrane comprises from 5 to 99.9% by weight of said hydrophobic polymeric matrix, relative to the weight of the membrane, and from 0.1 to 95% by weight of the copolymer according to the invention, relative to the weight of the membrane.

Advantageously, the membrane comprises from 65 to 99.9% by weight of said hydrophobic polymeric matrix relative to the weight of the membrane.

Preferably, the membrane comprises from 0.1 to 35% by weight of the copolymer according to the invention relative to the weight of the membrane.

The size of the pores of the microfiltration or ultrafiltration membrane manufactured in this way may vary from 1 nm to 1 μm. The size of the pores was determined by scanning electron microscopy SEM of the diameter of the pores opening on to the outer surface of the hollow fiber. This simple and rapid method makes it possible to estimate the size of the pores ranging from 10 to 100 nm.

This membrane may have any geometry, for example planar, spiral, tubular or hollow fibers.

Another subject of the present invention is a membrane obtainable by a particular process.

Advantageously, said polymeric membrane is obtainable by a phase inversion process, carried out in a manner that is conventional in itself, from a solution, referred to as a collodion, containing at least one hydrophobic polymeric matrix, at least one copolymer in accordance with the invention and optionally one or more other additives, in solution in a solvent.

In one particular embodiment of such a phase inversion process, said solution comprises:
from 4.9 to 50% by weight of said hydrophobic polymeric matrix, in particular of polyvinylidene fluoride, relative to the weight of the solution;
from 0.1 to 35% by weight of the copolymer according to the invention, relative to the weight of the solution;
from 15 to 95% by weight of solvent, relative to the weight of the solution;
optionally from 0 to 20% by weight of one or more additives, relative to the weight of the solution.

The solvent may especially be chosen from dimethylacetamide (DMAc), N-methylpyrrolidone (NMP), dimethylformamide (DMF), dimethyl sulfone ($DMSO_2$), dimethyl sulfoxide (DMSO), trialkyl phosphate, tetrahydrofuran (THF), acetone, benzaldehyde, acetophenone, benzophenone, hexamethylphosphoramide (HMPA), tetramethylurea (TMU), triethyl phosphate (TEP), trimethyl phosphate (TMP) or any other solvent which makes it possible to dissolve the hydrophobic polymeric matrix and the copolymer in accordance with the invention, or any combination of such solvents.

Among the additives, other than the copolymer in accordance with the invention, which may be chosen in the context of the invention as a function of the expected characteristics of the membrane, mention may be made of:
conventional additives, such as poly(methyl methacrylate) (PMMA), poly(ethylene glycol) (PEG), polyvinylpyrrolidone (PVP) or inorganic salts, such as lithium chloride (LiCl), magnesium chloride ($MgCl_2$) or zinc chloride ($ZnCl_2$);

nonsolvents for the hydrophobic polymer matrix, such as water, ethanol or methanol, or combinations of these nonsolvents;

oligomers, polymers, surfactants and/or copolymers other than, but of the same family as, the copolymer in accordance with the invention;

additives of metal and/or ceramic (nano)particle type, and also carbon nanotubes.

In order to implement the final step of the phase inversion process, in which the shaped collodion is brought into contact with a coagulation solution and a nonsolvent for the hydrophobic polymeric matrix, this nonsolvent, which can be in liquid form, in vapor form or in successively vapor then liquid form, may be of any type that is conventional in itself, especially water, methanol, ethanol, etc. The coagulation solution may also comprise one or more solvents for the hydrophobic polymeric matrix, preferentially identical to those contained in the collodion, for example NMP and glycerol in any proportion, and one or more additives, such as LiCl, PVP or PEG.

The phase inversion proper may otherwise be carried out by heat treatment, so as coagulate the initial solution, by decreasing the temperature or, for some systems, by increasing the temperature.

The operating parameters for the phase inversion processes are conventional in themselves and are described, for example, in the publications by Penga et al., 2012, *Progress in Polymer Science* 37: 1401-1424, or else by McKelvey et al., 1997, *Journal of membrane science* 124: 223-232.

By way of example, the temperature of the collodion may especially range from 10 to 175° C. The temperature of the coagulation bath may especially range from 5 to 95° C.

The step of shaping the collodion may be carried out by any means conventional in itself, for example, for the manufacture of hollow fibers, by an extrusion die, at a flow rate which may range from 0.1 to 72 ml/min.

In the particular embodiments of the polymeric membrane, in which said membrane is shaped so as to constitute the body of hollow fibers, the phase inversion process additionally provides, conventionally, for the use of an "internal liquid" solution which makes it possible to form the internal volume of the hollow fibers.

This internal liquid preferably contains a nonsolvent for the hydrophobic polymeric matrix, such as water, methanol, ethanol, etc., and, if appropriate, one or more solvents for the hydrophobic polymeric matrix, preferentially identical to those contained in the collodion, for example NMP or glycerol in any proportion, and one or more additives, such as LiCl, PVP or PEG. Its temperature may range from 5 to 95° C.

According to another aspect, the present invention relates to the use of a polymeric membrane comprising the copolymer of the invention for the treatment of effluents, in particular water.

The invention is illustrated by the following examples, which are not in any way limiting.

EXAMPLES

1) Synthesis of a Copolymer According to the Invention

A polymer material comprising a poly-n-butyl acrylate-co-polyhydroxyethyl methacrylate-b-polymethyl methacrylate-co-polybutyl acrylate-co-polyhydroxyethylmethacrylate diblock copolymer is prepared.

The process for preparing this polymer material may be applied to methods of bulk, solvent, emulsion or suspension polymerization. Each step of the process may be carried out in the same reactor via a batch process, or in different reactors, optionally according to semi-continuous or continuous processes.

The polymer materials prepared according to the example described below are respectively analyzed by:
$^1$H NMR in deuterated chloroform on a Brucker 400 apparatus;
size exclusion chromatography carried out at 30° C. using a polystyrene standard as reference for measuring the number-average molecular weights.

The monoalkoxyamine control agent and initiator of the following formula (I) is used:

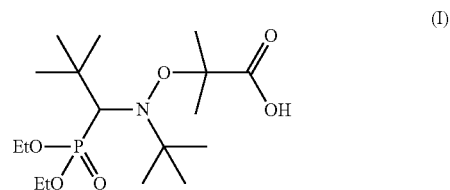

(I)

This initiator is sold by Arkema under the name BlocBuilder®MA.

a) Preparation of the Hydrophilic Block 10.8 kg of n-butyl acrylate and 2.7 kg of hydroxyethyl methacrylate and 490 g of the BlocBuilder®MA initiator described above are added, at ambient temperature, to a 20 liter jacketed stainless steel reactor fitted with a decompression valve tared at 10 bar and a "double propeller"-type stirrer. The mixture is degassed and maintained under a nitrogen atmosphere of 3 bar, then heated until it reaches the temperature of 110° C. The exothermy of the polymerization reaction is countered by virtue of a heat exchanger containing glycolated water at −25° C. The mixture is heated for 425 minutes until the polymerization reaction is complete. The solids content, measured by thermobalance, is 78%.

The mixture is then cooled to 80° C. then placed under vacuum at 10 mbar for 3 hours in order to remove the residual monomers from the reaction medium. 3 kg of toluene are then added to the reactor. A solution of polymer in toluene is recovered via a bottom valve.

Measurement of dry extract indicates that 76% conversion has been obtained, that is to say that 76% of the n-butyl acrylate and hydroxyethyl methacrylate present in the initial mixture have been polymerized.

The intermediate n-butyl acrylate and hydroxyethyl methacrylate polymer is characterized by size exclusion chromatography, which provides the following data:
Number-average molecular weight Mn=8728 g/mol;
Weight-average molecular weight Mw=11 646 g/mol;
Polydispersity index PI=1.33.

This solution of polymers is used as is for step b) below.

b) Preparation of the Diblock Copolymer

The amphiphilic diblock copolymer is prepared by controlled radical polymerization according to a conventional method, the preparation process of which is described below.

After cleaning with toluene, the same reactor as that used in step a) is charged with 6.34 kg of the solution obtained in step a) and 6.42 kg of methyl methacrylate, the initial mixture thus comprising 4.82 kg of living polyhydroxyethyl methacrylate and polybutyl acrylate, 1.52 kg of toluene and 6.42 kg of methyl methacrylate. The mixture is diluted with 2.23 kg of toluene. After placing under nitrogen, the reactor is heated to 105° C. for 90 minutes then to 120° C. for 90 minutes before being cooled to 50° C. in 15 minutes.

The final conversion is 71%.

The mixture is degassed, placed under nitrogen, stirred then heated to 120° C. for 150 minutes. The final mixture has a dry extract of 71%. It is then transferred, through a transfer line heated to 70° C., into a Clextral BC21 venting extruder having 5 venting wells and 12 heating zones, ranging from 70° C. at the inlet of the extruder up to 180° C. at the die of "rod" type. The molten block copolymer is then cooled in a water tank and then granulated.

This copolymer has the following characteristics:
Number-average molecular weight Mn=21 030 g/mol;
Weight-average molecular weight Mw=43 400 g/mol;
Polydispersity index PI=2.1.

The chemical composition of the copolymer is determined by $^1$H NMR and gives the following results:
polymethyl methacrylate: 47% by weight;
poly-n-butyl acrylate: 40% by weight;
polyhydroxyethyl methacrylate: 12% by weight;
methyl methacrylate<0.3% by weight;
n-butyl acrylate<detection limit;
hydroxyethyl methacrylate<detection limit;
toluene<0.5% by weight.

2) Manufacture of the Polymeric Filtration Membrane

A polymeric filtration membrane P1 in accordance with the present invention is manufactured from a collodion containing:
19.5% by weight of PVDF, having a melt viscosity of 5000 Pa·s at 230° C. and 100 s$^{-1}$ according to standard D3835;
3% by weight of the copolymer prepared during step 1);
68.5% by weight of NMP;
8% by weight of PVPK17;
1% by weight of PVPK90.

This fiber was extruded at 11 m·min$^{-1}$, in a solution containing a mixture of water and NMP.

The membrane manufactured in this way has an external diameter of 0.75 mm and an internal diameter of 0.41 mm.

The structure observed through the scanning electron microscope is foamy, without vacuoles and has two filtration skins, one on the inside and one on the outside containing 45-50 nm pores. The size of the pores was determined by scanning electron microscopy. The mechanical strength of this fiber is 6 MPa. The internal bursting pressure is 11 bar.

3) Blinding Test

A blinding test was carried out. Permeability losses and resistance in operation were evaluated for two membranes.

Membrane A is a comparative membrane corresponding to the membrane as disclosed in patent application WO 2014/139977. On its outer surface, it has pores of a similar size to those of membrane B, described below, that is to say approximately 45-50 nm. Membrane A comprises copolymer A1 as disclosed in patent application WO 2014/139977. Membrane A was prepared from a collodion A2 as disclosed in patent application WO 2014/139977.

Membrane B is the membrane according to the invention as it was prepared above. Membrane B comprises copolymer B1 as prepared above. Membrane B was prepared from a collodion B2 as disclosed above.

The composition of the two copolymers is summarized in table 1 below.

TABLE 1

| Composition | Copolymer A1 (comp.) | Copolymer B1 (inv.) |
|---|---|---|
| Hydrophilic block (% by weight) | 25 | 50 |
| Hydrophobic block (% by weight) | 75 | 50 |

The composition of the two collodions is summarized in table 2 below:

TABLE 2

| Composition | Collodion A2 (comp.) | Collodion B2 (inv.) |
|---|---|---|
| Copolymer A1 (% by weight) | 3 | — |
| Copolymer B1 (% by weight) | — | 3 |
| PVDF (% by weight) | 19.5 | 19.5 |
| NMP (% by weight) | 68.5 | 68.5 |
| PVP (% by weight) | 9 | 9 | a) Permeability Losses

Figure 2:
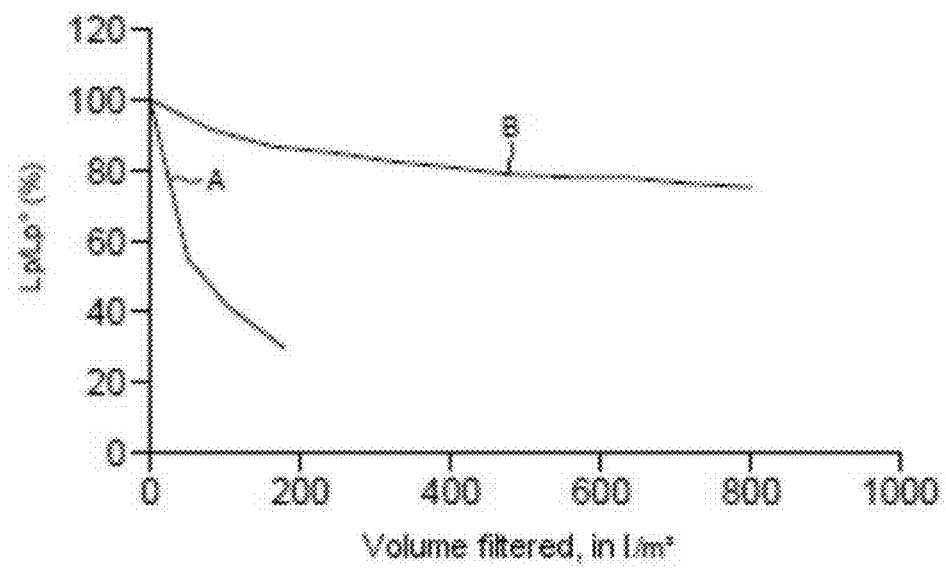
FIGS. 2 and 3 are graphs illustrating the permeability losses as a function of the filtered volume of filtration membranes.

FIG. 2 is a graph illustrating permeability losses as a function of the filtered volume of the two filtration membranes A (curve A) and B (curve B).

The following protocol was followed: membranes A and B underwent, in parallel, 10 cycles of filtration-backwashing composed of one hour of filtration at a high permeation flow (80 l/h·m$^2$) and backwashing with ultrafiltered tap water under 1.5 bar. The backwashing is stopped when the amount of water recovered is equal to half that produced during the filtration cycle. The drop in permeability is expressed as the decrease in permeability after backwashing as a function of the volume of filtered water per unit surface area. As can be seen in FIG. 2, the drop in permeability of membrane A is very rapid, whereas that of membrane B remains remarkably more stable and retains virtually 80% of its filtration capacity after 10 successive cycles of filtration at a high permeation flow.

FIG. 2 clearly shows a drop in the filtration performance regarding membrane A. Indeed, the permeability losses are approximately 70% after only 175 liters filtered per m$^2$ of membrane A. Conversely, the permeability losses are only 20% after 800 liters filtered per m$^2$ of membrane B.

Thus, it is clear that membrane B has improved permeability properties both in terms of performance and in terms of time.

b) Resistance in Operation

In order to evaluate the resistance in operation of membrane B, said membrane was exposed to doses of chemical products and filtration cycles which simulate, in a relatively short period of time (2.5 months), the main wear or fatigue which will be experienced by this membrane during its lifetime, equal to 10 years.

These fatigue tests were carried out under the following conditions: the membrane was exposed to 100 h of filtration of a harsh NaOCl solution at 1000 ppm and at a pH ranging from 6 to 7, then the membrane underwent 100 000 cycles of one minute comprising a filtration at 3 bar for 30 seconds followed by 30 seconds of backwashing at 3 bar. The tests of permeability stability were then carried out again on this membrane, referred to as "end of life" membrane, here referred to as membrane C.

Figure 3:
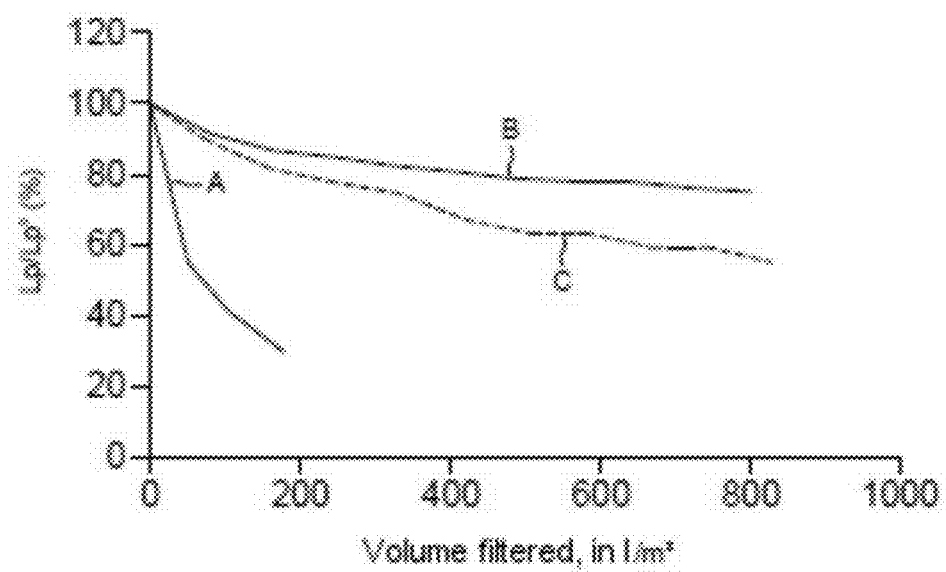

FIG. 3 is a graph illustrating permeability losses as a function of the filtered volume of the filtration membrane C (curve C). Curves A and B are recalled in FIG. 3 for the purposes of comparison.

As can be seen in FIG. 3, the difference in behavior between membrane B and membrane C is small. Conversely, the performance of membrane C is greatly superior to that of membrane A.

Thus, it is clear that the membrane according to the invention has improved properties of resistance in operation.

The invention claimed is:

1. An amphiphilic diblock copolymer consisting of:
50% by weight, relative to the weight of the copolymer, of a hydrophilic block consisting of:
77% by weight of units derived from an n-butyl acrylate monomer, relative to the weight of said hydrophilic block, and
23% by weight of units derived from a hydroxyethyl methacrylate monomer, relative to the weight of said hydrophilic block, and
50% by weight, relative to the weight of the copolymer, of a hydrophobic block comprising at least 99% by weight of polymethyl methacrylate relative to the weight of said hydrophobic block.

2. The copolymer as claimed in claim 1, wherein said hydrophilic block is composed of a statistical copolymer containing at least one unit derived from an n-butyl acrylate monomer and at least one unit derived from a hydroxyethyl methacrylate monomer.

3. The copolymer as claimed in claim 1, wherein said copolymer is a (poly-n-butyl acrylate-co-polyhydroxyethyl methacrylate-b-hydrophobic block) copolymer, the hydrophobic block comprising at least 99% by weight of polymethyl methacrylate, relative to the weight of the copolymer, and a mixture of units derived from methacrylate or acrylate monomers.

4. The copolymer as claimed in claim 1, wherein the weight-average molecular weight of said copolymer ranges from 10 to 400 kg/mol.

5. A polymeric membrane, comprising at least one hydrophobic polymeric matrix and at least one copolymer as defined in claim 1.

6. The polymeric membrane as claimed in claim 5, wherein the hydrophobic polymeric matrix is a fluoropolymer.

7. The polymeric membrane as claimed in claim 5, which comprises from 5 to 99.9% by weight of said hydrophobic polymeric matrix, relative to the weight of the membrane, and from 0.1 to 95% by weight of said copolymer relative to the weight of the membrane.

8. The polymeric membrane as claimed in claim 5, obtained by a phase inversion process, from a solution comprising at least one hydrophobic polymeric matrix, at least one copolymer as defined in claim 1 and optionally one or more other additives, in solution in a solvent.

9. The polymeric membrane as claimed in claim 8, obtained by said phase inversion process from a solution comprising:
from 4.9 to 50% by weight of said hydrophobic polymeric matrix, relative to the weight of the solution;
from 0.1 to 35% by weight of said copolymer, relative to the weight of the solution;
from 15 to 95% by weight of solvent, relative to the weight of the solution; and
optionally from 0 to 20% by weight of one or more additives, relative to the weight of the solution.

10. A method of making the polymeric membrane as defined in claim 5, comprising combining the hydrophobic polymeric matrix and the copolymer.

11. A method of treating an effluent, comprising contacting the effluent with the polymeric membrane as defined in claim 5.

12. The method as defined in claim 11, wherein the effluent is water.

* * * * *